United States Patent
Dhar et al.

(10) Patent No.: US 10,333,909 B2
(45) Date of Patent: Jun. 25, 2019

(54) METHODS AND SYSTEMS FOR BROADCASTING TARGETED ADVERTISEMENTS TO MOBILE DEVICE

(71) Applicant: Conduent Business Services, LLC, Dallas, TX (US)

(72) Inventors: Aritra Dhar, West Bengal (IN); Shailesh Vaya, Bangalore (IN)

(73) Assignee: Conduent Business Services, LLC, Dallas, TX (US)

( * ) Notice: Subject to any disclaimer, the term of this patent is extended or adjusted under 35 U.S.C. 154(b) by 627 days.

(21) Appl. No.: 15/018,963

(22) Filed: Feb. 9, 2016

(65) Prior Publication Data

US 2017/0230344 A1 Aug. 10, 2017

(51) Int. Cl.
| | | |
|---|---|---|
| *H04L 9/00* | (2006.01) | |
| *H04L 29/06* | (2006.01) | |
| *G06Q 30/02* | (2012.01) | |
| *H04L 9/08* | (2006.01) | |

(52) U.S. Cl.
CPC ..... *H04L 63/0435* (2013.01); *G06Q 30/0267* (2013.01); *H04L 9/088* (2013.01); *H04L 9/0819* (2013.01); *H04L 2209/50* (2013.01); *H04L 2209/601* (2013.01); *H04L 2209/80* (2013.01)

(58) Field of Classification Search
CPC ............... G06Q 30/02; G06Q 30/0207; G06Q 30/0224; G06Q 30/0241; G06Q 30/0251; G06Q 30/0255; G06Q 30/0257; G06Q 30/0269; G06Q 30/0281; H04L 63/045
See application file for complete search history.

(56) References Cited

U.S. PATENT DOCUMENTS

| | | |
|---|---|---|
| 6,327,574 B1 | 12/2001 | Kramer et al. |
| 7,698,551 B2 | 4/2010 | Lotspiech et al. |
| 7,823,207 B2 | 10/2010 | Evenhaim |
| 8,429,685 B2 | 4/2013 | Yarvis et al. |
| 8,655,891 B2 | 2/2014 | Ramer et al. |
| 8,751,305 B2 | 6/2014 | Manoogian, III et al. |
| 8,868,654 B2 | 10/2014 | Guha et al. |
| 2004/0037424 A1 | 2/2004 | Numao et al. |
| 2009/0048913 A1 | 2/2009 | Shenfield et al. |
| 2009/0048914 A1 | 2/2009 | Shenfield et al. |
| 2009/0235312 A1 | 9/2009 | Morad et al. |

(Continued)

OTHER PUBLICATIONS

XML Security Working Group F2F, Key Encapsulation: A New Scheme for Public-Key Encryption, May 2009 (Year: 2009).*

*Primary Examiner* — Meredith A Long
(74) *Attorney, Agent, or Firm* — Jones Robb, PLLC

(57) ABSTRACT

The disclosed embodiments illustrate methods and systems for identifying a targeted content item for a user. The method includes receiving one or more encrypted first attributes of the user, and a first key. Thereafter, one or more content items are encrypted using the first key. The one or more content items are stored in a data structure such that the one or more content items are indexed in the data structure according to one or more second attributes of the one or more content items. Thereafter, at least one encrypted content item is retrieved from the data structure based on the one or more encrypted content items, the indexing of the one or more content items, and the one or more encrypted first attributes. The at least one encrypted content item is decrypted to generate the targeted content item.

20 Claims, 6 Drawing Sheets

(56) References Cited

U.S. PATENT DOCUMENTS

| | | |
|---|---|---|
| 2010/0036737 A1 | 2/2010 | Shenfield et al. |
| 2012/0047019 A1 | 2/2012 | Choi et al. |
| 2012/0316956 A1 | 12/2012 | Nath et al. |
| 2014/0180822 A1 | 6/2014 | Peebles et al. |
| 2014/0229278 A1 | 8/2014 | Cohen et al. |
| 2016/0189461 A1* | 6/2016 | Kanon .................. H04L 9/008 705/51 |

* cited by examiner

METHODS AND SYSTEMS FOR BROADCASTING TARGETED ADVERTISEMENTS TO MOBILE DEVICE

TECHNICAL FIELD

The presently disclosed embodiments are related, in general, to targeted advertisements. More particularly, the presently disclosed embodiments are related to methods and systems for broadcasting targeted advertisements to a mobile device of a user, such that user's privacy is maintained.

BACKGROUND

With ever increasing advancement in the field of communication technologies and mobile devices, users are continuously engaged in transmission and/or reception of content and data to/from one or more sources over a network. In one example, a user may download a file from a search engine such as Google. In another example, a user may receive advertisements, coupons, or promotional offers related data from one or more websites, such as social networking websites or e-commerce websites.

However, during such transmission and/or reception of the content and the data, the one or more sources may keep a track of one or more activities of the users over the network. Such tracking activities may lead to the leakage of private and sensitive information of the users. At one end, the one or more sources may utilize such information for transmitting the targeted content and data to the users but at the other end, the confidentiality and privacy of the users are compromised.

SUMMARY

According to embodiments illustrated herein, there is provided a method for broadcasting targeted advertisements to a mobile device. The method includes transmitting, by one or more first processors, a catalog of one or more products/services to the mobile device based on at least a connection of the mobile device with a communication network. The method further includes receiving, by the one or more first processors, one or more encrypted attributes associated with a set of products/services from the one or more product/services, wherein the set of products/services is selected based on a user profile of a user associated with the mobile device. The method further includes transmitting, by the one or more first processors, a subset of encrypted symmetric keys corresponding to the one or more encrypted attributes associated with the set of products/services. The method further includes broadcasting, by the one or more first processors, one or more encrypted advertisements to the mobile device, wherein the mobile device decrypts the targeted advertisements from the one or more encrypted advertisements based on at least the subset of encrypted symmetric keys.

According to embodiments illustrated herein, there is provided a method for receiving targeted advertisements from an advertisement server. The method includes receiving, by one or more second processors, a catalog of one or more products/services from the advertisement server based on at least a connection with a communication network associated with the advertisement server. The method further includes transmitting, by the one or more second processors, one or more encrypted attributes associated with a set of products/services from the one or more product/services, wherein the set of products/services is selected based on a user profile of a user associated with a mobile device. The method further includes receiving, by the one or more second processors, a subset of encrypted symmetric keys corresponding to the transmitted one or more encrypted attributes. The method further includes receiving, by the one or more second processors, one or more encrypted advertisements from the advertisement server, wherein the targeted advertisements are decrypted from the one or more encrypted advertisements based on at least the subset of encrypted symmetric keys.

According to embodiments illustrated herein, there is provided an advertisement server for broadcasting targeted advertisements to a mobile device. The advertisement server includes one or more first processors configured to transmit a catalog of one or more products/services to the mobile device based on at least a connection of the mobile device with a communication network. The one or more first processors are further configured to receive one or more encrypted attributes associated with a set of products/services from the one or more product/services, wherein the set of products/services is selected based on a user profile of a user associated with the mobile device. The one or more first processors are further configured to transmit a subset of encrypted symmetric keys corresponding to the one or more encrypted attributes associated with the set of products/services. The one or more first processors are further configured to broadcast one or more encrypted advertisements to the mobile device, wherein the mobile device decrypts the targeted advertisements from the one or more encrypted advertisements based on at least the subset of encrypted symmetric keys.

According to embodiments illustrated herein, there is provided a mobile device for receiving targeted advertisements from an advertisement server. The mobile device includes one or more second processors configured to receive a catalog of one or more products/services from the advertisement server based on at least a connection with a communication network associated with the advertisement server. The one or more second processors are further configured to transmit one or more encrypted attributes associated with a set of products/services from the one or more product/services, wherein the set of products/services is selected based on a user profile of a user associated with the mobile device. The one or more second processors are further configured to receive a subset of encrypted symmetric keys corresponding to the transmitted one or more encrypted attributes. The one or more second processors are further configured to receive one or more encrypted advertisements from the advertisement server, wherein the targeted advertisements are decrypted from the one or more encrypted advertisements based on at least the subset of encrypted symmetric keys.

According to embodiments illustrated herein, there is provided a computer program product for use with a computing device. The computer program product comprises a non-transitory computer readable medium, the non-transitory computer readable medium stores a computer program code for broadcasting targeted advertisements to a mobile device. The computer readable program code is executable by one or more first processors in the computing device to transmit a catalog of one or more products/services to the mobile device based on at least a connection of the mobile device with a communication network. The computer readable program code is further executable by the one or more first processors to receive one or more encrypted attributes associated with a set of products/services from the one or more product/services, wherein the set of products/services is selected based on a user profile of a user associated with the mobile device. The computer readable program code is further executable by the one or more first processors to transmit a subset of encrypted symmetric keys corresponding to the one or more encrypted attributes associated with the set of products/services. The computer readable program code is further executable by the one or more first processors to broadcast one or more encrypted advertisements to the mobile device, wherein the mobile device decrypts the targeted advertisements from the one or more encrypted advertisements based on at least the subset of encrypted symmetric keys.

According to embodiments illustrated herein, there is provided a computer program product for use with a computing device. The computer program product comprises a non-transitory computer readable medium, the non-transitory computer readable medium stores a computer program code for receiving targeted advertisements from an advertisement server. The computer readable program code is executable by one or more second processors in the computing device to receive a catalog of one or more products/services from the advertisement server based on at least a connection with a communication network associated with the advertisement server. The computer readable program code is further executable by the one or more second processors to transmit one or more encrypted attributes associated with a set of products/services from the one or more product/services, wherein the set of products/services is selected based on a user profile of a user associated with the mobile device. The computer readable program code is further executable by the one or more second processors to receive a subset of encrypted symmetric keys corresponding to the transmitted one or more encrypted attributes. The computer readable program code is further executable by the one or more second processors to receive one or more encrypted advertisements from the advertisement server, wherein the targeted advertisements are decrypted from the one or more encrypted advertisements based on at least the subset of encrypted symmetric keys.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
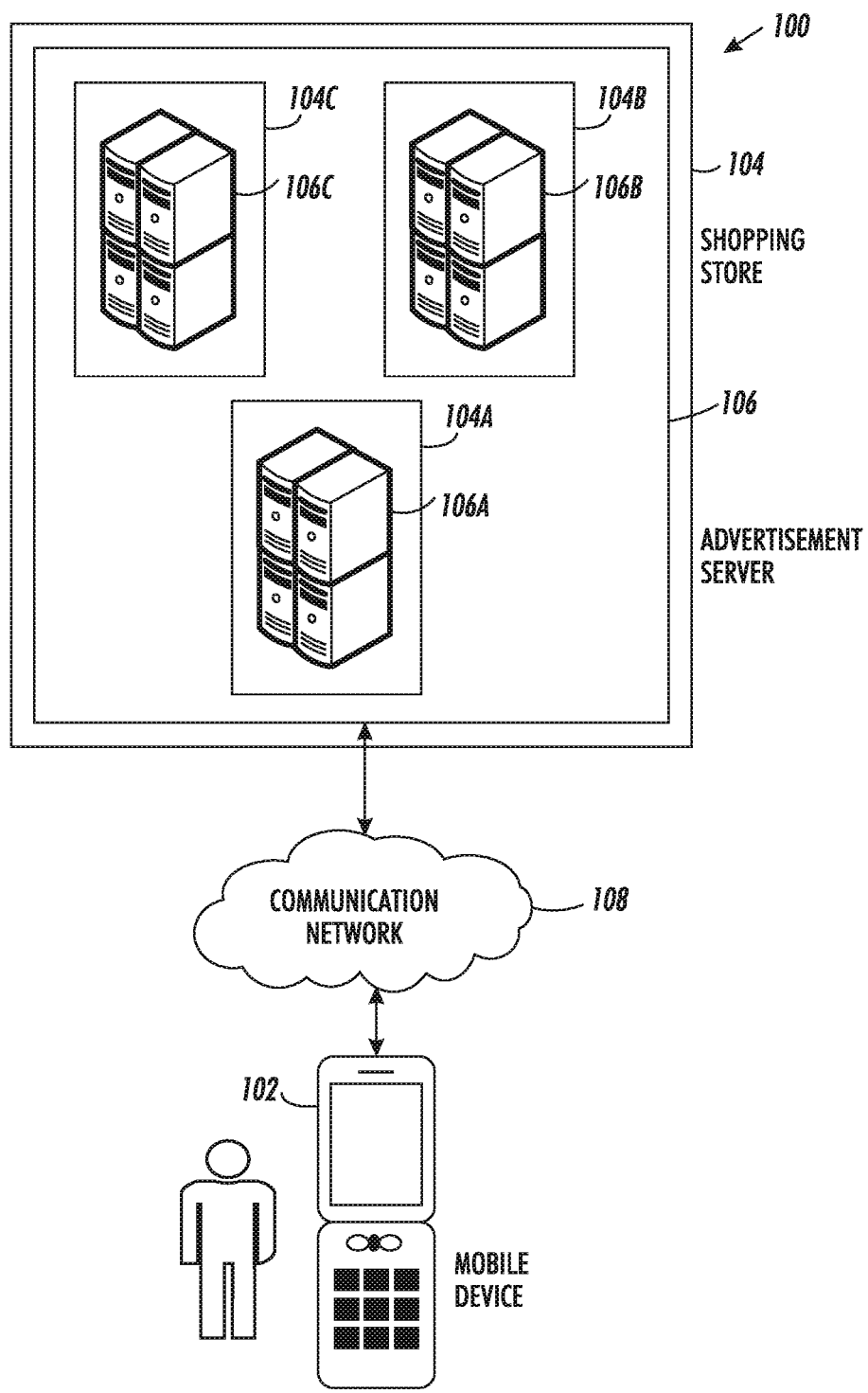
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example", and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a device that includes at least one processor/microcontroller and/or any other electronic components, that performs one or more operations according to one or more programming instructions. In an embodiment, the computing device has an associated display that may be utilized for displaying one or more content (e.g., images, videos, text messages, and/or the like). Examples of the computing device may include, but are not limited to, a desktop computer, a laptop, a PDA, a mobile device, an MFD, a smartphone, a tablet computer (e.g., iPad® and Samsung Galaxy Tab®), and/or the like.

An "encryption" refers to a process of encoding a content using one or more encryption algorithms. The encryption process generates a ciphertext of the content that can only be read if decrypted.

A "decryption" refers to a process of converting an encrypted content into a content that can be read and understood by a user. In an embodiment, the user may require a decryption key to decrypt the encrypted content.

A "key" refers to a random number generated using one or more cryptographic techniques. In an embodiment, the key may be utilized to encrypt the content to generate an encrypted content. Further, the key may be used for decrypting the encrypted content. In an embodiment, the key for encrypting the content may be different from the key for decrypting the content. For example, a computing device may generate a pair of keys using the one or more cryptographic techniques such that a content may be encrypted using one key and decrypted using the other.

A "user" refers to an individual who may utilize a computing device (e.g., a mobile device) to access a content (e.g., advertisements, promotional events, news, articles, and/or the like) on one or more websites over a communication network. In an embodiment, the user may have to create a user profile (or may have to sign-up) on the one or more websites to access the content. The user profile may include personal information associated with the user. For example, the user profile may include one or more of, but are not limited to, a name, an age, a gender, an educational background, hobbies/interests, and likes/dislikes. In an embodiment, the user profile may be created (or updated) automatically based on a type of the content usually accessed by the user on the one or more websites over the communication network. In an embodiment, the user may store the user profile details in his/her mobile device. Hereinafter, "user", "consumer", "customer", "purchaser", "buyer", "shopper", and/or the like may be interchangeably used.

An "advertisement" refers to a piece of information/data that may be accessed by a user on a computing device over a communication network. In an embodiment, the advertisement may include text, pictures, logos, symbols, hyperlinks, or a combination thereof that may be utilized for selling/promoting a product/service. In an embodiment, the advertisement may be displayed to consumers, when the consumers are connected over the communication network. In an embodiment, the advertisement may be presented to the consumers in different ways, such as a pop-up advertisement, a voice advertisement, a text/image advertisement adjacent to the crowdsourcing tasks, and the like.

A "targeted advertisement" refers to an advertisement that may be of interest to a user. In an embodiment, the targeted advertisement may be determined based on a user profile of the user.

A "catalog" refers to a list of items, particularly arranged in a systematic order. For example, a catalog of products may include products that are listed in an alphabetical order. In another example, a catalog of products may include products that are listed based on a preferences of a user.

"One or more attributes" refer to information pertaining to a set of products/services selected by a user from a list of products/services. In an embodiment, the one or more attributes may be representative of one or more preferences of the user for the one or more products/services. In an embodiment, the one or more attributes may be determined by a computing device of the user based on the user's browsing history, the user's profile on a social media platform (e.g., Facebook, Twitter, Google+, LinkedIn, and so forth), or other user inputs including information associated with the user.

FIG. 1 is a block diagram illustrating a system environment 100 in which various embodiments may be implemented. The system environment 100 includes a mobile device 102, one or more shopping stores (depicted by 104A, 104B, and 104C), one or more advertisement servers (depicted by 106A, 106B, and 106C), and a communication network 108. The one or more advertisement servers (depicted by 106A, 106B, and 106C) may be associated with the one or more shopping stores (depicted by 104A, 104B, and 104C) as shown in FIG. 1. Various devices in the system environment 100 (e.g., the mobile device 102, and the one or more advertisement servers (depicted by 106A, 106B, and 106C)) may be interconnected over the communication network 108. For the purpose of simplicity, hereinafter the one or more shopping stores (depicted by 104A, 104B, and 104C) and the one or more advertisement servers (depicted by 106A, 106B, and 106C) are represented as a shopping store 104 and an advertisement server 106, respectively.

The mobile device 102 refers to a computing device that comprises one or more processors and one or more memories. The one or more memories may include computer readable codes, instructions, or programs that are executable by the one or more processors to perform one or more first predetermined operations. In an embodiment, the mobile device 102 may include one or more installed applications or software programs, which may be utilized by a user to perform the one or more first predetermined operations. For example, the mobile device 102 may include a Wi-Fi tab. The user may turn-on the Wi-Fi to connect to a local network, such as the communication network 108 that may be available at a public place such as a shopping mall. Further, the mobile device 102 may have an installed application that the user may utilize to receive a catalog of one or more products/services from one or more sources such as the one or more advertisement servers (depicted by 106A, 106B, and 106C) over the communication network 108. In response to the received catalog of the one or more products/services, the mobile device 102 may be configured to transmit one or more attributes associated with a set of products/services selected from the catalog of the one or more products/services. The one or more attributes may be representative of one or more preferences of the user for the one or more products/services. In an embodiment, the mobile device 102 may be configured to determine the one or more attributes of the user. For example, the mobile device 102 may utilize the user's browsing history, user's profile on a social media platform (e.g., Facebook, Twitter, Google+, LinkedIn, and so forth), or other user inputs including personal information associated with the user, to determine the one or more attributes.

Further, in an embodiment, the mobile device 102 may present an option to the user to select his/her privacy level. In an embodiment, the mobile device 102 may be configured to transmit/receive the one or more attributes/content based on the privacy level selected by the user. The content may include one or more advertisements, offers, discounts, promo codes, and/or the like associated with the one or more products/services. In another embodiment, the mobile device 102 may utilize a predefined privacy level of the user to transmit/receive the one or more attributes/content.

Prior to the transmission or reception of the one or more attributes, or the content over the communication network 108, the mobile device 102 may be configured to initiate an oblivious transfer protocol based on at least a user input pertaining to his/her privacy level. The mobile device 102 may initiate the oblivious transfer protocol so as to maintain a privacy of the personal information of the user. In response to the initiation of the oblivious transfer protocol, the mobile device 102 may be configured to generate an encryption key and a decryption key. The mobile device may utilize one or more cryptographic techniques known in the art to generate the encryption key and the decryption key. Further, the mobile device 102 may utilize the encryption key to encrypt the one or more attributes pertaining to the preference of the user for the set of products/services.

Thereafter, the mobile device 102 may transmit the one or more encrypted attributes and the encryption key to the one or more advertisement servers associated with the one or more shopping stores. For example, the mobile device 102 may transmit the one or more encrypted attributes and the encryption key to the advertisement server 106 associated with the shopping store 104. In response to the transmitted one or more encrypted attributes, the mobile device 102 may receive a subset of encrypted symmetric keys and the encrypted content (e.g., one or more encrypted advertisements, coupons, offers, etc.) from the advertisement server 106. The mobile device 102 may further decrypt the subset of encrypted symmetric keys by use of the decryption key to obtain a subset of decrypted symmetric keys. The mobile device 102 may further utilize the subset of decrypted symmetric keys to decrypt the encrypted content to obtain content that may be of interest to the user. Such content may be referred to as targeted content. The user of the mobile device 102 may utilize the targeted content to avail one or more offers, discounts, and/or the like while purchasing one or more of the set of products/services.

The mobile device 102 may include a variety of computing devices such as, but not limited to, a laptop, a personal digital assistant (PDA), a tablet computer, a smartphone, a phablet, and/or the like.

The advertisement server 106 refers to a computing device or a software framework hosting an application and/or a software service. In an embodiment, the advertisement server 106 may be implemented to execute procedures such as, but not limited to, programs, routines, or scripts stored in one or more memories for supporting the hosted application and/or the software service. In an embodiment, the application and/or the software service may be configured to perform one or more second predetermined operations. For example, the advertisement server 106 may be configured to transmit the catalog of the one or more products/services to the mobile device 102 based on a detection of the mobile device 102 connected over the communication network 108. Based on the preference of the user for the set of products/services selected from the catalog of the one or more products/services, the advertisement server 106 may receive the one or more encrypted attributes and the encryption key from the mobile device 102. Further, the advertisement server 106 may generate a set of symmetric keys. The advertisement server 106 may utilize the set of symmetric keys to encrypt the content (e.g., one or more advertisements, coupons, promo codes, and/or the like). Further, in an embodiment, the advertisement server 106 may encrypt the set of symmetric keys by use of the received encryption key.

Further, in an embodiment, based on at least the one or more encrypted attributes, the advertisement server 106 may select the subset of encrypted symmetric keys from the set of encrypted symmetric keys. Thereafter, the advertisement server 106 may be configured to transmit the subset of encrypted symmetric keys to the mobile device 102 over the communication network 108. The advertisement server 106 may further be configured to transmit the encrypted content (e.g., the one or more encrypted advertisements, coupons, promo codes, and/or the like) to the mobile device 102. In an embodiment, the transmission of at least the subset of encrypted symmetric keys and the encrypted content may be performed using the oblivious transfer protocol such that the advertisement server 106 may not be aware of the subset of encrypted symmetric keys and the encrypted content that is being transmitted to the mobile device 102. Such type of transmission may help to preserve the privacy of the user.

The advertisement server 106 may be realized through various types of application servers such as, but not limited to, a Java application server, a .NET framework application server, a Base4 application server, a PHP framework application server, or any other application server framework.

The communication network 108 may include a medium through which devices such as the mobile device 102, and one or more servers such as the advertisement server 106 may communicate with each other. Further, the mobile device 102 and the advertisement server 106 may be configured to exchange data (e.g., content, attributes, keys, etc.) over the communication network 108. Examples of the communication network 108 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the system environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), and/or Bluetooth (BT) communication protocols.

Figure 2:
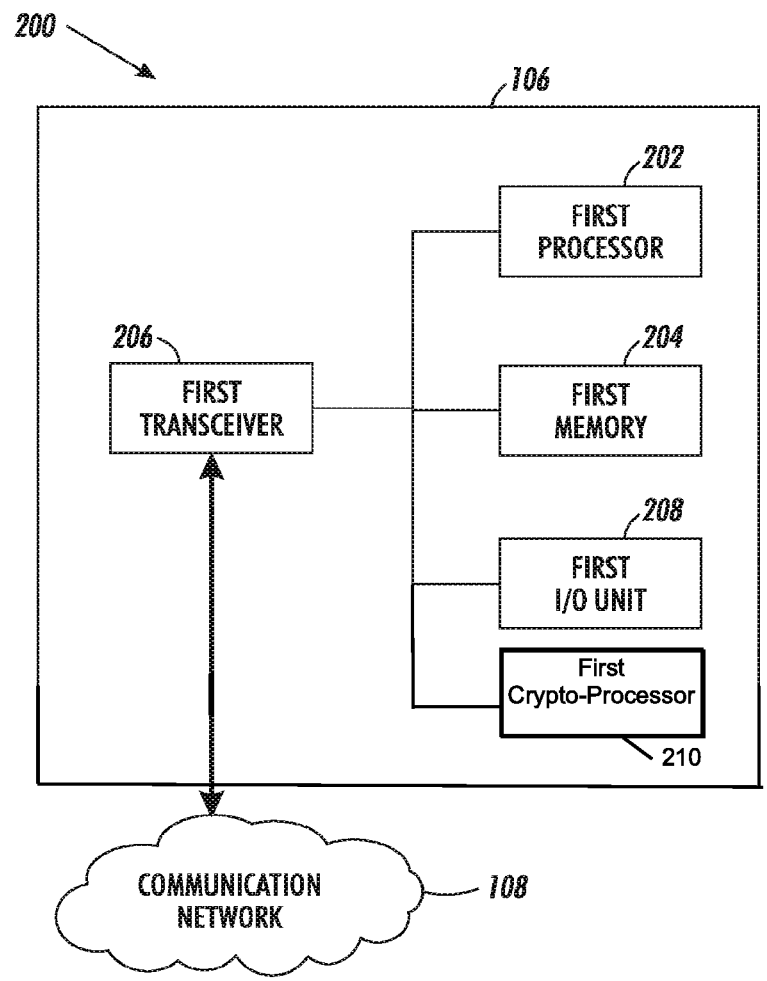
FIG. 2 is a block diagram that illustrates a system for broadcasting targeted advertisements to a user device, in accordance with at least one embodiment.

FIG. 2 is a block diagram 200 that illustrates an advertisement server 106 for broadcasting targeted advertisements to the mobile device 102, in accordance with at least one embodiment. The advertisement server 106 may include one or more first processors, such as a first processor 202, one or more first memories, such as a first memory 204, one or more first transceivers, such as a first transceiver 206, one or more first input/output units, such as a first input/output (I/O) unit 208, and one or more first crypto-processors, such as a first crypto-processor 210. The first transceiver 206 may be coupled with the communication network 108.

The first processor 202 may comprise suitable logic, circuitry, interfaces, and/or codes that may be configured to execute one or more sets of instructions stored in the first memory 204. The first processor 202 may be coupled to the first memory 204, the first transceiver 206, the first I/O unit 208, and the first crypto-processor 210. The first processor 202 may further include an arithmetic logic unit (ALU) and a control unit. The ALU may be coupled to the control unit. The ALU may be configured to perform one or more mathematical and logical operations and the control unit may be operable to control the operation of the ALU. The first processor 202 may execute the one or more sets of instructions, programs, codes, and/or scripts stored in the first memory 204 to perform the one or more second predetermined operations. The first processor 202 may be implemented based on a number of processor technologies known in the art. Examples of the first processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor, a microprocessor, a microcontroller, and/or the like.

The first memory 204 may comprise suitable logic, circuitry, and/or interfaces that may be operable to store one or more sets of instructions, codes, scripts, and/or computer programs having at least one code section executable by the first processor 202. In an embodiment, the first memory 204 may include one or more data structures (not shown). The one or more data structures may be configured to store the data. For example, a content data structure may be configured to store the content (e.g., one or more advertisements, coupons, promo codes, etc.). Further, an attribute data structure may be configured to store the one or more encrypted attributes received from the mobile device 102. A first key data structure may be configured to store the set of symmetric keys. Further, the first key data structure may store the subset of encrypted symmetric keys. Some of the commonly known memory implementations include, but are not limited to, a random access memory (RAM), a read only memory (ROM), a hard disk drive (HDD), and a secure digital (SD) card. In an embodiment, the first memory 204 may include the one or more machine codes, and/or computer programs that are executable by the first processor 202 to perform the one or more predefined operations. It will be apparent to a person having ordinary skill in the art that the one or more sets of instructions, programs, codes, and/or scripts stored in the first memory 204 may enable the hardware of the advertisement server 106 to perform the one or more second predetermined operations.

The first transceiver 206 may comprise suitable logic, circuitry, and/or interfaces that may be operable to communicate with the one or more devices, such as the mobile device 102. The first transceiver 206 may be operable to transmit or receive the content, the subset of encrypted symmetric keys, or other information and data to/from various components of the system environment 100. In an embodiment, the first transceiver 206 may be coupled to the first I/O unit 208 through which the first transceiver 206 may receive or transmit the instructions, queries, the one or more encrypted attributes, the encryption key, the encrypted content, the subset of encrypted symmetric keys, or other information corresponding to the broadcasting of the targeted advertisements to the mobile device 102. In an embodiment, the first transceiver 206 may receive and/or transmit various data in accordance with various communication protocols such as, TCP/IP, UDP, and 2G, 3G, or 4G communication protocols through an input terminal and/or an output terminal, via the first I/O unit 208.

The first I/O unit 208 may comprise suitable logic, circuitry, interfaces, and/or code that may be configured to transmit or receive the catalog of the one or more products/services, the content, keys (e.g., the encryption key, the subset of encrypted symmetric keys, etc.) and other information to/from the one or more devices, such as the mobile device 102 over the communication network 108. The first I/O unit 208 may also provide an output to the user. The first I/O unit 208 may comprise various input and output devices that may be configured to communicate with the first transceiver 206. The first I/O unit 208 is connected with the communication network 108 through the input terminal (not shown) and the output terminal (not shown). In an embodiment, the input terminal and the output terminal may be realized through, but are not limited to, an antenna, an Ethernet port, an USB port or any other port that can be configured to receive and transmit data. Examples of the I/O unit 208 may include, but are not limited to, a keyboard, a mouse, a joystick, a touch screen, a touch pad, a microphone, a camera, a motion sensor, and/or a light sensor.

The first crypto-processor 210 is a processor configured to perform one or more cryptographic operations on the content. Further, the first crypto-processor 210 may be configured to generate one or more cryptographic keys for encryption/decryption purposes. In an embodiment, the first crypto-processor 210 may include one or more electronic circuits and/or gates that are capable of generating the one or more cryptographic keys and performing the one or more cryptographic operations. The first crypto-processor 210 may be realized through various electronic components such as, but not limited to, a System-on-Chip (SoC) component, an Application-Specific Integrated Circuit (ASIC) component, or a Field Programmable Logical Array (FPGA) component. Though the first crypto-processor 210 is depicted as a separate entity, a person skilled in the art will appreciate that the scope of the disclosure is not limited to realizing functionality of the first crypto-processor 210 by the first processor 202. In an embodiment, the first crypto-processor 210 may be implemented within the first processor 202 without departing from the spirit of the disclosure. Further, a person skilled in the art will understand that the scope of the disclosure is not limited to realizing the first crypto-processor 210 as a hardware component. In an embodiment, the first crypto-processor 210 may be implemented as a software module included in computer program code (stored in the first memory 204), which may be executable by the first processor 202 to perform the functionalities of the first crypto-processor 210.

Figure 3:
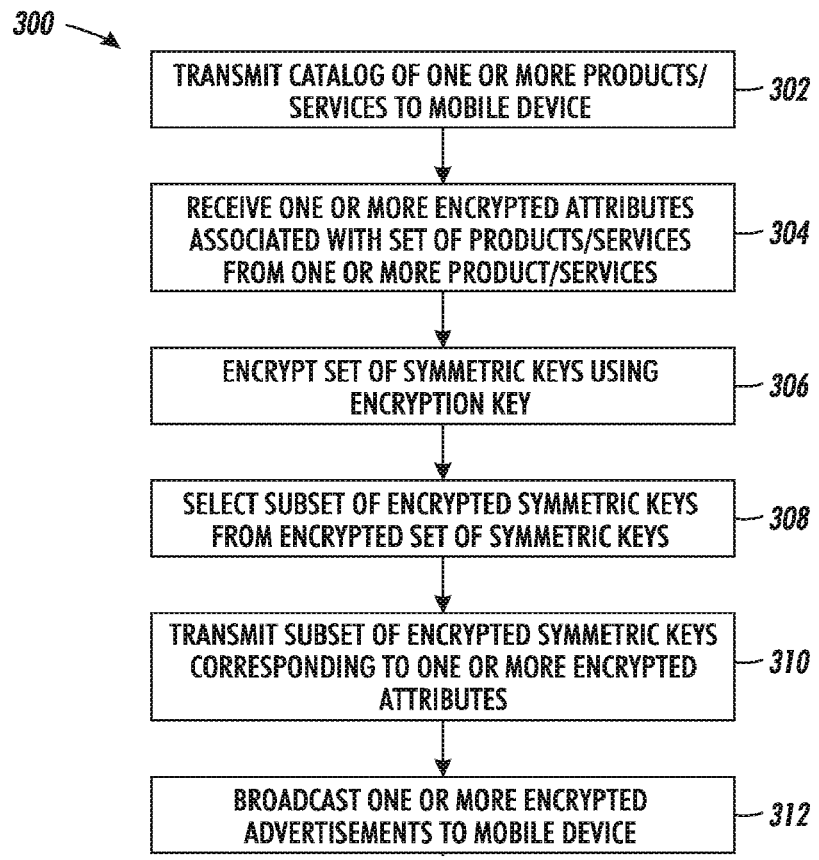
FIG. 3 is a flowchart illustrating a method for broadcasting targeted advertisements to a user device, in accordance with at least one embodiment.

An embodiment of the operation of the advertisement server 106 has been explained further in conjunction with FIG. 3.

FIG. 3 is a flowchart 300 illustrating a method for presenting the targeted content from the content (e.g., the one or more advertisements, coupons, offers, etc.) to the user, in accordance with at least one embodiment. The flowchart 300 has been described in conjunction with FIG. 1 and FIG. 2.

At step 302, the catalog of the one or more products/services is transmitted to the mobile device 102. In an embodiment, the first transceiver 206 may be configured to transmit the catalog of the one or more products/services to the mobile device 102 over the communication network 108. The catalog of the one or more products/services may correspond to a list of the one or more products/services associated with the shopping store 104. In an embodiment, the one or more products/services in the catalog may be listed in a specific order, for example, in an alphabetical sequence, or based on a count of a product/service sold by the shopping store 104.

Prior to transmitting the catalog of the one or more products/services to the mobile device 102, the first processor 202 may be configured to check whether the mobile device 102 is connected to the local network of the one or more shopping stores. The local network may correspond to the network (e.g., the communication network 108) through which various devices may communicate with each other. For examples, the local network may include one or more of, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). In one embodiment, each of the one or more shopping stores in the shopping mall or a market place may provide its own the local network facilities (e.g., the communication network 108) to one or more users. In another embodiment, the one or more shopping stores may have a common local network (e.g., the communication network 108).

Based on the detection of the connection of the mobile device 102 over the communication network 108, the first processor 202 may be configured to extract the catalog of the one or more products/services from the first memory 204. Further, the first processor 202 in conjunction with the first transceiver 206 may transmit the catalog of the one or more products/services to the mobile device 102.

At step 304, the one or more encrypted attributes associated with the set of products/services are received. In an embodiment, the first transceiver 206 may be configured to receive the one or more encrypted attributes associated with the set of products/services from the mobile device 102. The mobile device 102 may have generated the one or more attributes based on at least the selection of the set of products/services from the one or more products/services. The set of products/services may have been selected based on the one or more preferences of the user. For example, a catalog of 26 items (e.g., a first item is "A", a second item is "B", . . . , a twenty fifth item is "Y", a twenty sixth item is "Z") is transmitted to a user device, such as the mobile device 102. The mobile device 102, based on at least one or more user inputs, generates five attributes. The one or more user inputs may represent the selection of five items from the catalog of 26 items. In another embodiment, the mobile device 102 may select the five items based on a user profile of the user. Let the selected five items from the 26 items are the first item "A", the fifth item "E", the tenth item "J", the twenty fourth item "X", and the twenty sixth item "Z". Let the five generated attributes corresponding to the selected five items are a first attribute as Aa, a second attribute as Ee, a third attribute as Jj, a fourth attribute as Xx, and a fifth attribute as Zz. The mobile device 102 may further encrypt the generated five attributes using the encryption key and thereafter, transmit the encrypted five attributes to the advertisement server 106.

In an embodiment, the first transceiver 206 may further receive the encryption key from the mobile device 102. Thereafter, the first transceiver 206 may be configured to store the received one or more encrypted attributes and encryption key in the first memory 204.

At step 306, the set of symmetric keys is encrypted. In an embodiment, the first crypto-processor 210 may be configured to encrypt the set of symmetric keys. Prior to encrypting the set of symmetric keys, the first crypto-processor 210 may be configured to generate the set of symmetric keys based on an instruction message received from the first processor 202 to encrypt the content. The first processor 202 may be configured to transmit such instruction message to the first crypto-processor 210 based on at least the initiation of the oblivious transfer protocol by the mobile device 102. In an embodiment, the mobile device 102 may have initiated the oblivious transfer protocol to maintain the privacy of the sensitive and private information of the user. The oblivious transfer protocol may be implemented by use of one or more cryptosystem techniques known in the art. For example, Paillier cryptosystem, additive harmonic cryptosystem, and/or the like. Based on at least the initiation of the oblivious transfer protocol, the first crypto-processor 210 may be configured to generate the set of symmetric keys.

In an embodiment, the set of symmetric keys may include one or more symmetric keys. In an embodiment, the count of the one or more symmetric keys in the set of symmetric keys may depend on the count of the one or more products/services in the catalog. For example, the catalog includes five products/services (e.g., P1, P2, S1, P3, S2). In such a case, the first crypto-processor 210 may generate five symmetric keys (e.g., SKP1, SKP2, SKS1, SKP3, SKS2), such that each symmetric key is utilized to encrypt the corresponding products/services. For example, SKP1 is used to encrypt P1, SKP2 Is used to encrypt P2, SKS1 Is used to encrypt S1, and so on. In another embodiment, the count of the one or more symmetric keys in the set of symmetric keys may depend on the count of the content (e.g., one or more advertisements, offers, coupons, etc.) associated with each of the one or more products/services in the catalog. For example, the catalog include one product (P) and one service (S). There are two offers (OP1 and OP2) on the product (P) and three offers (OS1, OS2, and OS3) on the service. In such a case, the first crypto-processor 210 may generate five symmetric keys (e.g., SKOP1, SKOP2, SKOS1, SKOS2, SKOS3), such that each symmetric key is utilized to encrypt the corresponding content associated with the one or more products/services. For example, SKOP1 Is used to encrypt OP1, SKOP2 Is used to encrypt OP2, SKOS1 Is used to encrypt OS1, and so on. In another embodiment, the count of the one or more symmetric keys in the set of symmetric keys may depend on the count of the one or more products/services in the catalog and the count of the content (e.g., one or more advertisements, offers, coupons, etc.) associated with each of the one or more products/services in the catalog.

After generating the set of symmetric keys, the first processor 202 may be configured to store the set of symmetric keys. The first processor 202 may utilize one or more known techniques known in the art to store the set of symmetric keys. For example, the first processor 202 may create a data structure to store the set of symmetric keys. As discussed supra, the set of symmetric keys may include the one or more symmetric keys corresponding to the one or more products/services in the catalog, and/or the content of the one or more products/services. In an embodiment, the first processor 202 may be configured to index the one or more symmetric keys in the data structure based on a respective bit-string representing the content (i.e., the one or more advertisements, offers, coupons, and/or the like). In an embodiment, the data structure may correspond to, for example, a tree data structure that includes one or more nodes connected by one or more edges. In the tree data structure, the one or more nodes are arranged in one or more hierarchal levels. In an embodiment, a number of hierarchal levels in the tree data structure may be directly proportional to a number of bits in the bit-string. The lower most hierarchal level in the tree data structure includes one or more leaf nodes, which may be used to store the one or more symmetric keys. Each pair of leaf nodes are connected to a parent node at a first hierarchal level (i.e., next hierarchal level to the lower most hierarchal level). Similarly, each pair of parent nodes, at the first hierarchal level, is connected to a second parent node at a second hierarchal level (i.e., next hierarchal level to the first hierarchal level) and so forth. In an embodiment, a node at a hierarchal level is used to temporarily store one of the two symmetric keys stored in the child nodes of the node. After indexing the one or more symmetric keys in the data structure, the first processor 202 may store the created data structure of the one or more symmetric keys in a database server (not shown) and/or the first memory 204.

A person having ordinary skill in the art will understand that it may not be necessary that each of the one or more leaf nodes may store a symmetric key. There may exist leaf nodes from the one or more leaf nodes that may not have any associated symmetric key. For example, a tree data structure has four leaf nodes and a number of symmetric keys to be stored in the leaf nodes is three. In such a scenario, one of the four leaf nodes may be empty and may not store any symmetric key.

An example method of indexing one or more content items in a tree like data structure has been described in the U.S. application Ser. No. 14/708,524, filed May 11, 2015, hereby incorporated by reference and assigned to the same assignee, Xerox Corporation.

After storing the set of symmetric keys, for example, in a data structure, each of the one or more symmetric keys in the set of symmetric keys is encrypted. In an embodiment, the first processor 202 may be configured to utilize the first crypto-processor 210 to encrypt the set of symmetric keys by use of one or more cryptographic techniques known in the art. The first crypto-processor 210 may utilize the received encryption key to encrypt the set of symmetric keys to obtain the set of encrypted symmetric keys. The set of encrypted symmetric keys comprises one or more encrypted symmetric keys.

At step 308, the subset of encrypted symmetric keys is selected. The subset of encrypted symmetric keys may include one or more of the one or more encrypted symmetric keys from the set of symmetric keys. In an embodiment, the first processor 202 may be configured to select the subset of encrypted symmetric keys from the set of encrypted symmetric keys. In an embodiment, the first processor 202 may select the subset of encrypted symmetric keys from the set of encrypted symmetric keys based on at least one or more of the set of encrypted symmetric keys in the data structure, the indexing of each of the set of symmetric keys, and the one or more encrypted attributes received from the mobile device 102. In an embodiment, the selection of the subset of encrypted symmetric keys may be dependent upon the type of cryptographic techniques that may have been used for encrypting the set of symmetric keys. For example, an additively Homomorphic cryptographic technique has been utilized to encrypt the set of symmetric keys (stored in a tree data structure) by use of the encryption key. For the simplicity of the ongoing description, the set of symmetric keys is assumed to include four symmetric keys represented by K0, K1, K2, and K3. Further, for the purpose of the ongoing description, the one or more attributes of each content are represented by a 2-bit bit-string. Further, in the current scenario, the first processor 202 may generate a tree data structure having three hierarchal levels. The first hierarchal level includes a root node (e.g., node-1). The root node has two child nodes (e.g., node-2 and node-3). In an embodiment, the nodes (i.e., node-2 and node-3) constitute a second hierarchal level of the tree data structure. Similarly, the node-2 is connected to two nodes (e.g., node-4 and node-5). Further, the node-3 is connected to two nodes (e.g., node-6 and node-7). The nodes (i.e., node-4, node-5, node-6, and node-7) constitute a third hierarchal level of the tree data structure. In an embodiment, the nodes (i.e., node-4, node-5, node-6, and node-7) may form the leaf nodes of the tree data structure. Therefore, the leaf nodes (i.e., node-4, node-5, node-6, and node-7) may be configured to store the four encrypted symmetric keys (e.g., E(K0), E(K1), E(K2), and E(K3)). For each pair of leaf nodes (i.e., node-4 and node-5, and node-6 and node-7) having a common parent node (i.e., node-2, and node-3, respectively) in the tree data structure, the first processor 202 may determine the following expression:

$$E(K(N_0)) \cdot (E(b_0))^{K(N_1)-K(N_0)} \quad (1)$$

where, $N_0, N_1$: a pair of leaf node nodes having a common parent node in the tree data structure;

$K(N_0), K(N_1)$: symmetric keys stored at the leaf nodes $N_0$ and $N_1$, respectively;

E( ): an additively Homomorphic encryption function;

$b_0$: the Least Significant Bit (LSB) of the bit string representing the one or more attributes; and $E(b_0)$: the encrypted least significant bit (LSB) in the bit string associated with the one or more encrypted attributes.

A person having ordinary skill in the art will appreciate that an additively Homomorphic cryptographic technique may satisfy the following conditions:

$$E(A) \cdot E(B) = E(A+B) \quad (2)$$

$$(E(A))^x = E(x \cdot A) \quad (3)$$

where,

E( ): an additively Homomorphic encryption function;

A, B: symmetric keys; and x: a real number.

Using the conditions 2 and 3, the first processor 202 may simplify the expression 1 as:

$$E(K(N_0) + b_0 \cdot (K(N_1) - K(N_0))) \quad (4)$$

For illustrative purpose, let the one or more attributes are represented by a 2-bit string "10". The first processor 202 may receive the encrypted bit string corresponding to each of the one or more encrypted attributes. As the value of $b_0$ is "0" (i.e., the LSB of the 2-bit string representing the one or more attributes), $K(N_0)$ is E(K0), and $K(N_1)$ is E(K1), the first processor 202 may determine a final value of the expression 4 as E(K0). Similarly, for the leaf nodes (node-6 and node-7) having the parent node (node-3), the first processor 202 determine the final value as E(K2). In the next iteration, the nodes (i.e., node-2 and node-3) are considered as the leaf nodes of the tree data structure. At this stage, the node-2 stores the encrypted symmetric key E(K0) and the node-3 stores the encrypted symmetric key E(K2). As the nodes (i.e., node-2 and node-3) have a common parent node (i.e., node-1), the first processor 202 may repeat the step as discussed supra to retrieve the at least one encrypted symmetric key from E(K0) and E(K1) using the at least one least significant bit (i.e., b1). Thus, as the next least significant bit, i.e., $b_1$ is "1" (i.e., the next significant bit of the 2-bit string representing the one or more attributes), the first processor 202 may utilize the equation 4 to determine the at least one encrypted symmetric keys as E(K2).

Since the first processor 202 is not aware of the decryption key, the first processor 202 may not be able to decrypt the one or more encrypted attributes to determine the one or more attributes of the user. Further, the first processor 202 may not be aware of the index of the retrieved at least one encrypted symmetric key as the retrieval of the at least one encrypted symmetric key involves performing one or more cryptographic operations (as discussed), which may not reveal the index of the at least one encrypted symmetric key.

At step 310, the subset of encrypted symmetric keys is transmitted to the mobile device 102. In an embodiment, the first transceiver 206 may be configured to transmit the subset of encrypted symmetric keys to the mobile device 102 over the communication network 108. As discussed supra, the subset of encrypted symmetric keys is selected from the set of encrypted symmetric keys based on the one or more encrypted attributes. In an embodiment, the first processor 202 in conjunction with the first transceiver 206 may perform the transmission of the subset of encrypted symmetric keys to the mobile device 102 using the oblivious transfer protocol. In such a case, the advertisement server 106 may not be aware of the subset of encrypted symmetric keys that is being transmitted to the mobile device 102.

At step 312, the encrypted content is broadcasted to the mobile device 102. In an embodiment, the first processor 202 may be configured to broadcast the encrypted content to the mobile device 102 over the communication network 108. In an embodiment, the encrypted content may include the one or more encrypted advertisements, coupons, promo codes, and/or the like. In on embodiment, the encrypted content may be associated with the one or more products/services present in the catalog. In another embodiment, the encrypted content may be associated with the set of products/services selected from the one or more products/services in the catalog. In an embodiment, the first processor 202 in conjunction with the first transceiver 206 may perform the broadcasting of the encrypted content to the mobile device 102 using the oblivious transfer protocol. In such a case, the advertisement server 106 may not be aware of the encrypted content that is being transmitted to the mobile device 102 over the communication network 108.

Figure 4:
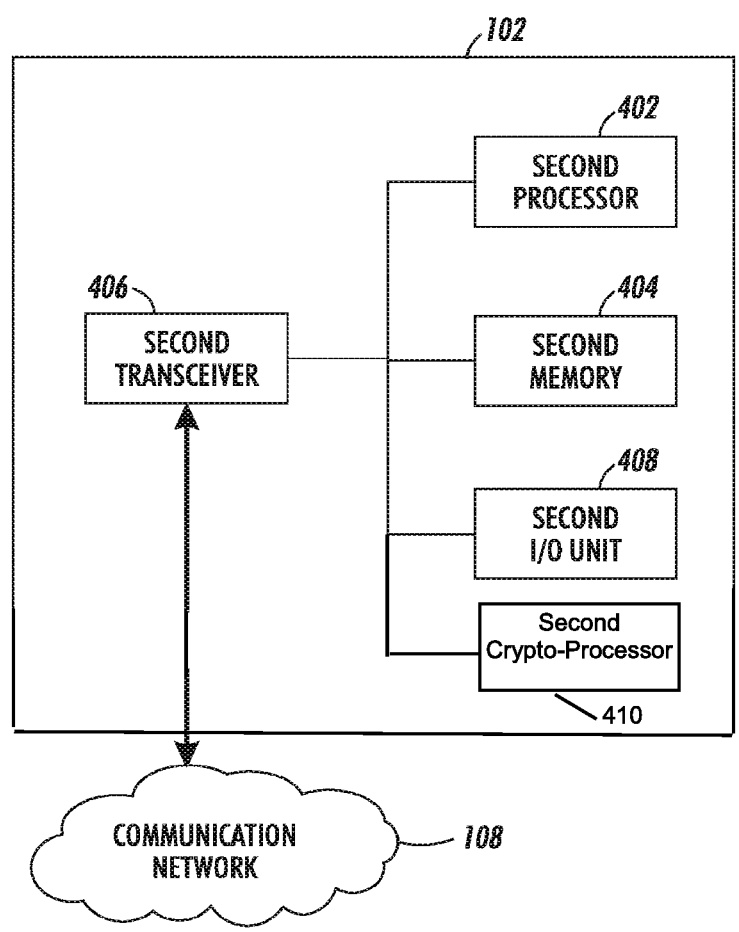
FIG. 4 is a block diagram that illustrates a system for receiving targeted advertisements from a server, in accordance with at least one embodiment.

FIG. 4 is a block diagram that illustrates a mobile device 102 for receiving the targeted advertisements from the advertisement server 106, in accordance with at least one embodiment. The mobile device 102 may include one or more second processors, such as a second processor 402, one or more second memories, such as a second memory 404, one or more second transceivers, such as a second transceiver 406, one or more second input/output units, such as a second input/output (I/O) unit 408, and one or more second crypto-processors, such as a second crypto-processor 410. The second transceiver 406 may be coupled with the communication network 108.

The second processor 402 may comprise suitable logic, circuitry, interfaces, and/or codes that may be configured to execute one or more sets of instructions stored in the second memory 404. The second processor 402 may be coupled to the second memory 404, the second transceiver 406, the second I/O unit 408, and the second crypto-processor 410. The second processor 402 may further include an arithmetic logic unit (ALU) and a control unit. The ALU may be coupled to the control unit. The ALU may be configured to perform one or more mathematical and logical operations and the control unit may be operable to control the operation of the ALU. The second processor 402 may execute the one or more sets of instructions, programs, codes, and/or scripts stored in the second memory 404 to perform the one or more first predetermined operations. The second processor 402 may be implemented based on a number of processor technologies known in the art. Examples of the second processor 402 include, but are not limited to, an X86-based processor, a Reduced Instruction Set Computing (RISC) processor, an Application-Specific Integrated Circuit (ASIC) processor, and/or a Complex Instruction Set Computing (CISC) processor, a microprocessor, a microcontroller, and/or the like.

The second memory 404 may comprise suitable logic, circuitry, and/or interfaces that may be operable to store one or more sets of instructions, codes, scripts, and/or computer programs having at least one code section executable by the second processor 402. In an embodiment, the second memory 404 may include one or more data structures (not shown). The one or more data structures may be configured to store the data. For example, a user profile data structure may be configured to store the personal information (e.g., name, age, gender, likes/dislikes, etc.). Further, a browsing history data structure may be configured to store the browsing history of the user over a period of time. A second key data structure may be configured to store the encryption key and the decryption key. Further, the second key data structure may store the subset of encrypted symmetric keys. Some of the commonly known memory implementations include, but are not limited to, a random access memory (RAM), a read only memory (ROM), a hard disk drive (HDD), and a secure digital (SD) card. In an embodiment, the second memory 404 may include the one or more machine codes, and/or computer programs that are executable by the second processor 402 to perform the one or more first predetermined operations. It will be apparent to a person having ordinary skill in the art that the one or more sets of instructions, programs, codes, and/or scripts stored in the second memory 404 may enable the hardware of the mobile device 102 to perform the one or more first predetermined operations.

The second transceiver 406 may comprise suitable logic, circuitry, and/or interfaces that may be operable to communicate with the one or more servers, such as the advertisement server 106. The second transceiver 406 may be operable to transmit or receive the one or more encrypted attributes, the encryption key, the encrypted content, the subset of encrypted symmetric keys, or other information and data to/from various components of the system environment 100. In an embodiment, the second transceiver 406 may be coupled to the second I/O unit 408 through which the second transceiver 406 may receive or transmit the instructions, queries, the one or more encrypted attributes, the encryption key, the encrypted content, the subset of encrypted symmetric keys, or other information corresponding to the broadcasting of the targeted advertisements to the mobile device 102. In an embodiment, the second transceiver 406 may receive and/or transmit various data in accordance with various communication protocols such as, TCP/IP, UDP, and 2G, 3G, or 4G communication protocols through an input terminal and/or an output terminal, via the second I/O unit 408.

The second I/O unit 408 may comprise suitable logic, circuitry, interfaces, and/or code that may be configured to receive or transmit the catalog of the one or more products/services, the encrypted content, keys (e.g., the encryption key, the subset of encrypted symmetric keys, etc.) and other information to/from the one or more devices, such as the advertisement server 106 over the communication network 108. The second I/O unit 408 may also provide an output to the user. The second I/O unit 408 may comprise various input and output devices that may be configured to communicate with the second transceiver 406. The receive I/O unit 408 is connected with the communication network 108 through the input terminal (not shown) and the output terminal (not shown). In an embodiment, the input terminal and the output terminal may be realized through, but are not limited to, an antenna, an Ethernet port, a USB port or any other port that can be configured to receive and transmit data. Examples of the second I/O unit 408 may include, but are not limited to, a keyboard, a mouse, a joystick, a touch screen, a touch pad, a microphone, a camera, a motion sensor, and/or a light sensor.

The second crypto-processor 410 is a processor configured to perform one or more cryptographic operations on the one or more attributes. Further, the first crypto-processor 210 may be configured to generate one or more cryptographic keys for encryption/decryption purposes. In an embodiment, the second crypto-processor 410 may include one or more electronic circuits and/or gates that are capable of generating the one or more cryptographic keys and performing the one or more cryptographic operations. The second crypto-processor 410 may be realized through various electronic components such as, but not limited to, a System-on-Chip (SoC) component, an Application-Specific Integrated Circuit (ASIC) component, or a Field Programmable Logical Array (FPGA) component. Though the second crypto-processor 410 is depicted as a separate entity, a person skilled in the art will appreciate that the scope of the disclosure is not limited to realizing functionality of the second crypto-processor 410 by the second processor 402. In an embodiment, the second crypto-processor 410 may be implemented within the second processor 402 without departing from the spirit of the disclosure. Further, a person skilled in the art will understand that the scope of the disclosure is not limited to realizing the second crypto-processor 410 as a hardware component. In an embodiment, the second crypto-processor 410 may be implemented as a software module included in computer program code (stored in the second memory 404), which may be executable by the second processor 402 to perform the functionalities of the second crypto-processor 410.

Figure 5:
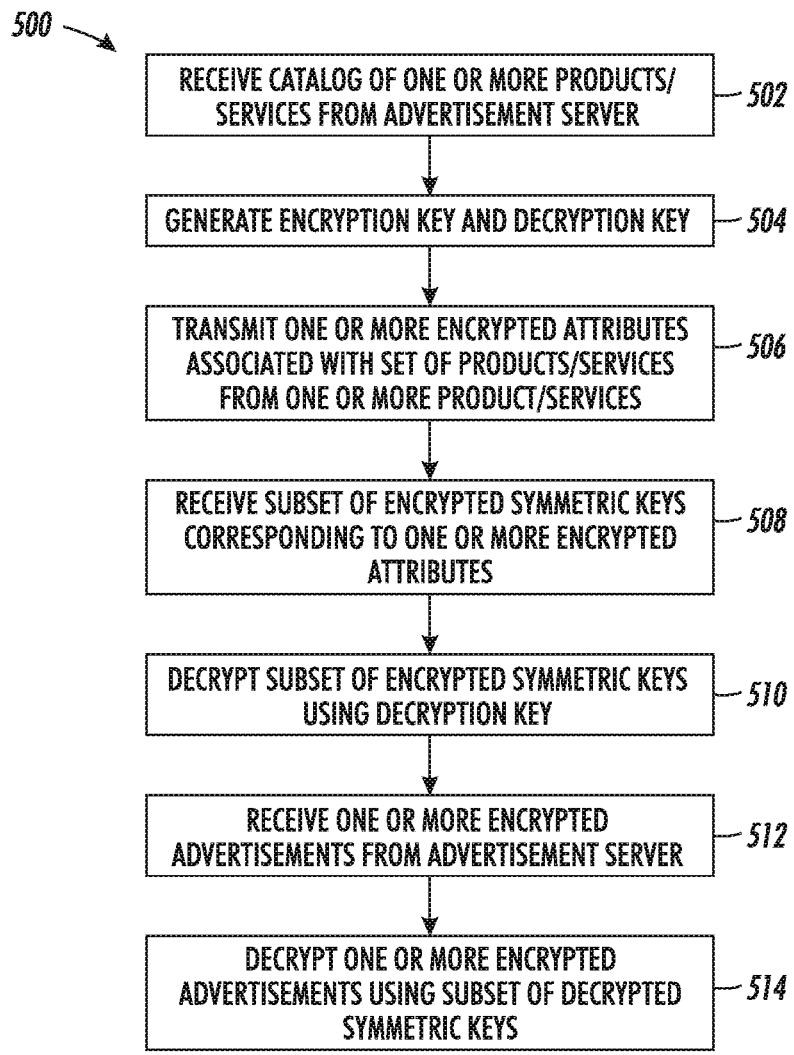
FIG. 5 is a flowchart illustrating a method for receiving targeted advertisements from a server, in accordance with at least one embodiment.

An embodiment of the operation of the mobile device 102 has been explained further in conjunction with FIG. 5.

FIG. 5 is a flowchart 500 illustrating a method for receiving targeted advertisements from the advertisement server 106, in accordance with at least one embodiment. The flowchart 500 has been described in conjunction with FIG. 1, FIG. 2, FIG. 3, and FIG. 4.

At step 502, the catalog of the one or more products/services is received. In an embodiment, the second transceiver 406 may be configured to receive the catalog of the one or more products/services from the advertisement server 106. The catalog of the one or more products/services may correspond to the list of the one or more products/services associated with the one or more shopping stores (depicted by 104A, 104B, and 104C).

Prior to receiving the catalog of the one or more products/services, the second processor 402 may receive an input from the user of the mobile device 102 to connect with one or more local networks, such as the communication network 108. The one or more local networks may be associated with the one or more shopping stores. The user may utilize his/her computing device, such as the mobile device 102, to connect with at least one local network (e.g., the communication network 108). Based on at least the connection with the at least one local network, the second transceiver 406 may receive the catalog of the one or more products/services from the advertisement server 106 (associated with the selected local network). In an embodiment, the second transceiver 406 may further be configured to store the catalog of the one or more products/services in the second memory 404.

At step 504, the set of products/services is selected from the catalog of the one or more products/services. In an embodiment, the second processor 402 may be configured to select the set of products/services from the catalog of the one or more products/services. In an embodiment, the second processor 402 may select the set of products/services from the one or more products/services based on at least the user profile of the user stored in the second memory 404. The user profile may include at least the personal information of the user. For example, the user profile may include one or more of, but are not limited to, a name, an age, a gender, an educational background, hobbies/interests, and likes/dislikes. The user profile may further include the one or more preferences of the user for the one or more products/services. In an embodiment, the second processor 402 may update the user profile of the user based on at least the user's browsing history, and one or more activities of the user on one or more social media websites. In another embodiment, the second processor 402 may select the set of products/services from the one or more products/services based on at least the one or more user inputs received from the user in response to the received catalog of the one or more products/services.

At step 506, the one or more attributes are generated. In an embodiment, the second processor 402 may be configured to generate the one or more attributes pertaining to the set of products/services selected from the catalog of the one or more products/services. The one or more attributes may be representative of at least the one or more preferences of the user for the one or more products/services and an information associated with the selection of the set of products/services based on the one or more preferences. After generating the one or more attributes, the second transceiver 406 may be configured to transmit the one or more attributes to the advertisement server 106.

Prior to transmitting the one or more attributes, the second processor 402 may be configured to initiate the oblivious transfer protocol so as to maintain the user's privacy. In an embodiment, the second processor 402 may initiate the oblivious transfer protocol based on at least the predefined instruction stored in the second memory 404 or the user input received from the user of the mobile device 102. The oblivious transfer protocol between two devices (e.g., the mobile device 102 and the advertisement server 106) may maintain the privacy of data when the data is transmitted between the two devices.

Based on at least the initiation of the oblivious transfer protocol by the second processor 402, the second crypto-processor 410 may be configured to generate the encryption key and the decryption key. In an embodiment, the second crypto-processor 410 may generate the encryption key and the decryption key using a Rivest, Shamir, Adleman (RSA) cryptographic algorithm. However, a person skilled in the art will appreciate that the scope of the disclosure is not limited to generating the encryption key and the decryption key using a RSA algorithm. Various cryptographic techniques known in the art may be utilized to generate the encryption key and the decryption key without departing from the scope of the disclosure.

Further, in an embodiment, the second crypto-processor 410 may utilize the encryption key to encrypt the one or more attributes. Further, the second transceiver 406 may transmit the one or more encrypted attributes to the advertisement server 106 over the communication network 108. In an embodiment, the second transceiver 406 may further transmit the encryption key to the advertisement server 106.

At step 508, the subset of encrypted symmetric keys is received. In an embodiment, the second transceiver 406 may be configured to receive the subset of encrypted symmetric keys from the advertisement server 106 over the communication network 108. The advertisement server 106 may have selected the subset of encrypted symmetric keys from the set of encrypted symmetric keys based on at least the received one or more encrypted attributes.

At step 510, after receiving the subset of encrypted symmetric keys, the second crypto-processor 410 may utilize the decryption key to decrypt the subset of encrypted symmetric keys. Thereafter, the second processor 402 may store the subset of decrypted symmetric keys in the second memory 404.

At step 512, the encrypted content is received. In an embodiment, the second transceiver 406 may be configured to receive the encrypted content from the advertisement server 106 over the communication network 108. The encrypted content may include one or more encrypted advertisements, coupons, promo codes, and/or the like. The second transceiver 406 may further store the encrypted content in the second memory 404.

Further, in an embodiment, at step 514, the second crypto-processor 410 may utilize the subset of decrypted symmetric keys to decrypt the encrypted content. The decryption of the encrypted content may generate the targeted content (e.g., one or more targeted advertisements, coupons, promo codes, etc.). The second processor 402 may present the targeted content on the display screen of the mobile device 102. The user of the mobile device 102 may utilize one or more of the targeted content to purchase the one or more products/services from the corresponding shopping store. In an embodiment, the user of the mobile device 102 may purchase the one or more products from the one or more shopping stores (denoted by 104A, 104B, 104C, and so on) based on at least a comparison of the targeted content received from each of the one or more shopping stores.

In certain scenarios, it may be possible that the user of the mobile device 102 may share the targeted content with other users or competitors. In an embodiment, the advertisement server 106 may implement one or more known traitor tracing mechanisms, such as a complete subtree method, to prevent such incidents. By use of such one or more traitor tracing mechanisms, the advertisement server 106 may prevent the other users or competitors from decrypting the targeted content.

Figure 6:
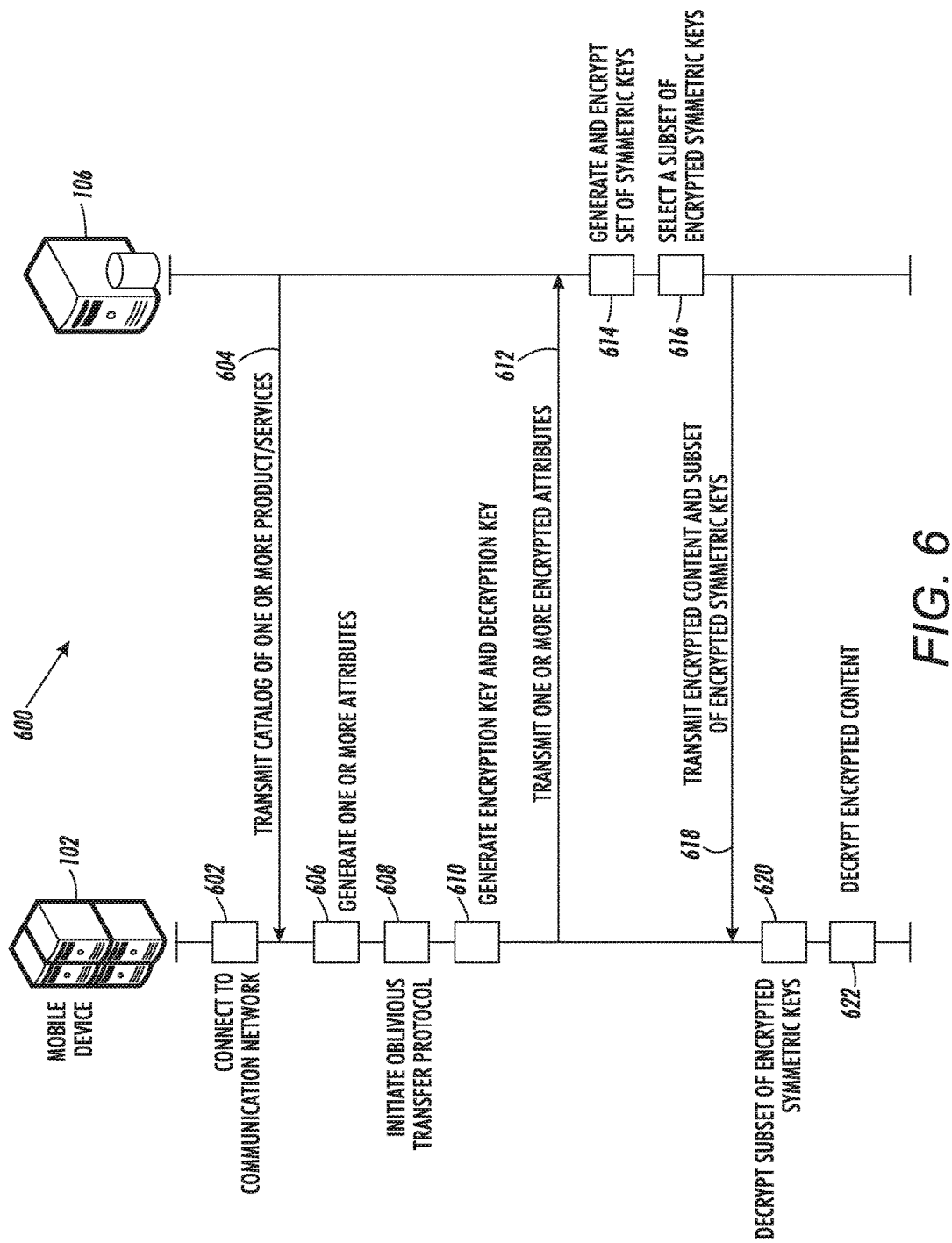
FIG. 6 is a message flow diagram illustrating flow of message/data between various components of the system environment, in accordance with at least one embodiment.

FIG. 6 is a message flow diagram 600 illustrating flow of message/data between various components of the system environment 100, in accordance with at least one embodiment. The message flow diagram 600 has been explained in conjunction with FIG. 1, FIG. 2, FIG. 3, FIG. 4, and FIG. 5.

As shown in FIG. 6, the mobile device 102 may be configured to connect with the communication network 108 (denoted by 602). The communication network 108 may correspond to a local network provided by one or more entities (e.g., one or more shopping stores). Based on the connection with the communication network 108, the advertisement server 106 may transmit the catalog of the one or more products/services associated with the shopping store 104 to the mobile device 102 (denoted by 604). In case more than one catalog is transmitted, the advertisement server 106 may present a user interface on the display screen of the mobile device 102 that may allow the user of the mobile device 102 to select one catalog at a time.

After receiving the catalog, the mobile device 102 may be configured to generate the one or more attributes (denoted by 606). The one or more attributes may be indicative of the one or more preferences of the user for the one or more products/services. The mobile device 102 may generate the one or more attributes based on the at least one or more of the user's profile, the user's browsing history, the user's historical shopping pattern, and/or the like. In one embodiment, the mobile device 102 may generate the one or more attributes based on the one or more products/services selected by the user from the catalog. Further, the mobile device 102 may be configured to initiate the oblivious transfer protocol so as to maintain the user's privacy (denoted by 608). After initiation of the oblivious transfer protocol, the mobile device 102 may generate the encryption key and the decryption key (denoted by 610). Further, the mobile device 102 may utilize the encryption key to encrypt the one or more attributes. Thereafter, the mobile device 102 may be configured to transmit the one or more encrypted attributes to the advertisement server 106 (denoted by 612). The mobile device 102 may further transmit the encryption key to the advertisement server 106.

The advertisement server 106 may further be configured to generate the set of symmetric keys (denoted by 614). The set of symmetric keys may comprise the one or more symmetric keys pertaining to the one or more products/services. The advertisement server 106 may utilize the one or more symmetric keys to encrypt the content (e.g., one or more advertisements, offers, promo codes, etc.) corresponding to the one or more products/services. Further, the advertisement server 106 may be configured to encrypt the set of symmetric keys by use of the encryption key (denoted by 616). Further, in an embodiment, the advertisement server 106 may be configured to select the subset of encrypted symmetric keys from the set of encrypted symmetric keys (denoted by 618). The subset of symmetric keys are selected from the set of symmetric keys based on at least the one or more encrypted attributes. The advertisement server 106 may utilize one or more techniques known in the art to retrieve the subset of encrypted symmetric keys from the set of encrypted symmetric keys based on the one or more encrypted attributes.

Further, the advertisement server 106 may transmit the encrypted content (i.e., one or more encrypted advertisements, offers, promo codes, etc.) and the subset of encrypted symmetric keys to the mobile device 102 over the communication network 108 (denoted by 618). The mobile device 102 may utilize the decryption key to decrypt the subset of encrypted symmetric keys (denoted by 620). Further, the mobile device 102 may utilize the subset of decrypted symmetric keys to decrypt the encrypted content (denoted by 622). The decryption of the encrypted content may provide the user with the content that may be of his/her interests. Further, based on the targeted content, the user of the mobile device 102 may choose to shop from a particular shopping store such as the shopping store 104.

A person having ordinary skill in the art will understand that the subset of encrypted symmetric keys may not be decrypted without the decryption key. Thus, as the advertisement server 106 may be unaware of the decryption key, the advertisement server 106 may not be able to decrypt the subset of encrypted symmetric keys (that was transmitted to the mobile device 102). Further, the advertisement server 106 may not be able to decrypt the one or more encrypted attributes to determine the one or more attributes of the user. Hence, the privacy and confidentiality of the user of the mobile device 102 may not be compromised.

The disclosed embodiments encompass numerous advantages. Various embodiments of the disclosure may enable a secure transmission of a targeted content between various devices. The one or more shopping stores may utilize the disclosed method to deliver targeted content to one or more users over the one or more local networks and at the same time, the one or more shopping stores are oblivious to details such as a user profile or the targeted content delivered to the one or more users. Hence the disclosed method helps in protecting the privacy of the one or more users. Such a method minimizes the leakage of the private and sensitive information of the one or more users. Further, a set of encrypted symmetric keys is generated in such a way that if a user leaks such keys to other users or competitors, they are easily detected by use of traitor tracing mechanisms.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for broadcasting targeted content to a mobile device have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for encrypting targeted advertisements transmitted to a mobile device, the method comprising:
   transmitting, by one or more processors, a catalog of one or more products/services to the mobile device;
   receiving, by the one or more first processors, one or more encrypted attributes associated with a set of products/services from the one or more product/services and an encryption key, wherein the set of products/services is selected based on a user profile of a user associated with the mobile device;
   generating, by the one or more processors, a set of symmetric keys;
   encrypting, by the one or more processors, one or more advertisements for the one or more products/services using the set of symmetric keys, wherein each symmetric key of the set of symmetric keys encrypts a corresponding product/service advertisement of the one or more advertisements;
   encrypting, by the one or more processors, the set of symmetric keys with the received encryption key;
   selecting, by one or more processors, a subset of encrypted symmetric keys;
   transmitting, by the one or more processors, the subset of encrypted symmetric keys corresponding to the received one or more encrypted attributes; and
   transmitting the encrypted one or more advertisements.

2. The method of claim 1, wherein one or more attributes include at least an information associated with a selection of the set of products/services, and a preference of the user for each of the set of products/services, wherein the one or more attributes are encrypted by said a mobile device using an encryption key to obtain the one or more encrypted attributes.

3. The method of claim 2, wherein the subset of encrypted symmetric keys is selected from the encrypted set of symmetric keys based on at least the received one or more encrypted attributes.

4. The method of claim 3 further comprising receiving, by the one or more processors, the encryption key from the mobile device over a communication network.

5. The method of claim 1, wherein the advertisements include at least one or more offers, discounts, and coupons associated with the selected set of products/services.

6. The method of claim 1, wherein the one or more encrypted attributes and the subset of encrypted symmetric keys are received using an oblivious transfer protocol over a communication network.

7. A method for decrypting targeted advertisements from an advertisement server, the method comprising:
receiving, by one or more processors, a catalog of one or more products/services from the advertisement server via a communication network associated with the advertisement server;
generating, by the one or more processors, an encryption key and a decryption key;
encrypting, by the one or more processors, one or more attributes associated with a set of products/services from the one or more products/services with the encryption key;
transmitting, by the one or more processors, the one or more encrypted attributes associated with a set of products/services from the one or more product/services and the encryption key, wherein the set of products/services is selected based on a user profile of a user associated with a mobile device;
receiving, by the one or more processors, a subset of encrypted symmetric keys corresponding to the transmitted one or more encrypted attributes;
receiving, by the one or more processors, one or more encrypted advertisements from the advertisement server;
decrypting, by the one or more processors, the subset of encrypted symmetric keys using the generated decryption key; and
decrypting the encrypted advertisements using the decrypted subset of symmetric keys.

8. The method of claim 7 the encryption key and the decryption key are generated based on at least an initiation of an oblivious transfer protocol.

9. The method of claim 8, wherein one or more attributes include at least an information associated with a selection of the set of products/services, and a preference of the user for each of the set of products/services.

10. The method of claim 8, wherein the decrypted advertisements are indicative of at least one or more offers, discounts, and coupons associated with the selected set of products/services.

11. An advertisement server for encrypting targeted advertisements transmitted to a mobile device, the advertisement server comprising:
one or more processors configured to:
transmit a catalog of one or more products/services to the mobile device;
receive one or more encrypted attributes associated with a set of products/services from the one or more product/services and an encryption key, wherein the set of products/services is selected based on a user profile of a user associated with the mobile device;
generate a set of symmetric keys;
encrypt one or more advertisements for the one or more products/services using the set of symmetric keys, wherein each symmetric key of the set of symmetric keys encrypts a corresponding product/service advertisement of the one or more advertisements;
encrypt the set of symmetric keys with the received encryption key;
transmit the set of encrypted symmetric keys corresponding to the received one or more encrypted attributes; and
transmit the encrypted one or more advertisements.

12. The advertisement server of claim 11, wherein the one or more processors are further configured to receive an encryption key from the mobile device over a communication network.

13. The advertisement server of claim 12, wherein the set of encrypted symmetric keys is selected from the encrypted set of symmetric keys based on at least the one or more encrypted attributes.

14. The advertisement server of claim 11, wherein the one or more processors are further configured to present a user interface on a display screen of the mobile device displaying the targeted advertisements, wherein the targeted advertisements include at least one or more offers, discounts, and coupons associated with the selected set of products/services.

15. A mobile device for decrypting targeted advertisements from an advertisement server, the mobile device comprising:
one or more processors configured to:
receive a catalog of one or more products/services from the advertisement server based on at least a connection with a communication network associated with the advertisement server;
generate an encryption key and a decryption key;
encrypt one or more attributes associated with a set of products/services from the one or more products/services;
transmit one or more encrypted attributes associated with a set of products/services from the one or more product/services and encryption key, wherein the set of products/services is selected based on a user profile of a user associated with the mobile device;
receive an encrypted subset of symmetric keys corresponding to the transmitted one or more encrypted attributes; and
receive one or more encrypted advertisements from the advertisement server;
decrypt the encrypted subset of symmetric keys using the generated decryption key; and
decrypt the encrypted advertisements using the decrypted subset of symmetric keys
wherein the targeted advertisements are decrypted from the one or more encrypted advertisements based on at least the subset of encrypted symmetric keys.

16. The mobile device of claim 15, wherein the one or more processors are further configured to generate an encryption key and a decryption key based on at least an initiation of an oblivious transfer protocol between the mobile device and the advertisement server.

17. The mobile device of claim 16, wherein the one or more processors are further configured to decrypt the received subset of encrypted symmetric keys by use of the decryption key.

18. The mobile device of claim 17, wherein the one or more processors are further configured to decrypt the received one or more encrypted advertisements by use of the decrypted subset of encrypted symmetric keys to view the targeted advertisements, wherein the decrypted targeted advertisements are indicative of at least one or more offers, discounts, and coupons associated with the selected set of products/services.

19. A computer program product for use with a computer, the computer program product comprising a non-transitory computer readable medium, wherein the non-transitory computer readable medium stores a computer program code for encrypting targeted advertisements transmitted to a mobile device, wherein the computer program code is executable by one or more processors to:
- transmit a catalog of one or more products/services to the mobile device;
- receive one or more encrypted attributes associated with a set of products/services from the one or more product/services and an encryption key, wherein the set of products/services is selected based on a user profile of a user associated with the mobile device;
- generate a set of symmetric keys;
- encrypt one or more advertisements for the one or more products/services using the set of symmetric keys, wherein each symmetric key of the set of symmetric keys encrypts a corresponding product/service advertisement of the one or more advertisements;
- encrypt the set of symmetric keys with the received encryption key;
- transmit the set of encrypted symmetric keys corresponding to the received one or more encrypted attributes; and
- transmitting the encrypted one or more advertisements.

20. A computer program product for use with a computer, the computer program product comprising a non-transitory computer readable medium, wherein the non-transitory computer readable medium stores a computer program code for decrypting targeted advertisements from an advertisement server, wherein the computer program code is executable by one or more processors to:
- receive a catalog of one or more products/services from the advertisement server based on at least a connection with a communication network associated with the advertisement server;
- generate an encryption key and a decryption key;
- encrypt one or more attributes associated with a set of products/services from the one or more products/services;
- transmit one or more encrypted attributes associated with a set of products/services from the one or more product/services and encryption key, wherein the set of products/services is selected based on a user profile of a user associated with a mobile device;
- receive an encrypted subset of symmetric keys corresponding to the transmitted one or more encrypted attributes; and
- receive one or more encrypted advertisements from the advertisement server;
- decrypt the encrypted subset of symmetric keys using the generated decryption key; and
- decrypt the encrypted advertisements using the decrypted subset of symmetric keys
- wherein the targeted advertisements are decrypted from the one or more encrypted advertisements based on at least the subset of encrypted symmetric keys.

* * * * *